March 26, 1957  M. RETTINGER  2,786,895
FILM SYNCHRONIZING MARKER AND SYSTEM
Filed Dec. 7, 1951

INVENTOR.
Michael Rettinger
BY
ATTORNEY.

United States Patent Office 2,786,895
Patented Mar. 26, 1957

2,786,895

FILM SYNCHRONIZING MARKER AND SYSTEM

Michael Rettinger, Encino, Calif., assignor to Radio Corporation of America, a corporation of Delaware Application December 7, 1951, Serial No. 260,442

The terminal fifteen years on the term of the patent to be granted has been disclaimed 8 Claims. (Cl. 179—100.2)

This invention relates to the art of magnetic sound film recording and reproducing, and particularly to a device or unit for placing a start or synchronization mark on a magnetic sound film to aid in combining the sound record on the film with a sound record or picture on one or more other films.

In the production of sound motion pictures, it is well-known that the picture is photographed on one film and the concomitant sound record on a separate film to obtain better quality pictures and sound records and for flexibilty of operation. The images on the two films are later combined into a composite print for exhibition purposes. In order to facilitate the proper combination of the picture and sound films during the cutting, editing, and rerecording processes, it is necessary that start or synchronization marks be placed on each film so that they may be properly combined to make the composite print.

There are two types of synchronizing processes now in general use in motion picture studios when both films are photographic. The first is by the use of synchronous motors for driving both the picture camera and the sound recorder. When the films are so driven and the motors have reached uniform speed, both the picture and sound films are marked by exposure to synchronizing lamps. In other words, the films are marked "on the run." The other general method of synchronizing films is by the use of marks placed on the film when they are at stand-still. This can be done when the systems use self-synchronous motors, wherein the motors are interlocked at standstill and then accelerated in step. In the latter system, the first frame in the picture aperture may be overexposed to provide a start mark and the sound film punched, notched, or marked by a pencil. With the use of magnetic film or tape for recording the concomitant sound, a new marking system for the magnetic film is desirable, particularly one which may be reproduced in a sound reproducer during the editing process when the film is advanced at a speed below the normal sound reproducing speed. It has been found that a standard single gap or conductor head, although usable for marking when the film is running, will not record a signal which is suitable for editing purposes. The present invention is directed to a magnetic marker for a magnetic sound film which may be used with either the "on the run" or "standstill" types of film driving systems.

The principal object of the invention, therefore, is to facilitate the marking of films, the images on which are to be subsequently combined on a single film.

Another object of the invention is to provide an improved start or synchronization marker for a magnetic sound film.

A further object of the invention is to provide a marker for providing a start or synchronization mark on a magnetic sound film either during the advancement of the film or during the standstill periods of the film.

A still further object of the invention is to provide a system which simultaneously records an invisible start mark signal and a visible mark on a magnetic film.

A still further object of the invention is to provide a system which simultaneously records an invisible start mark signal on the magnetic portion of a combination magnetic and photographic film and a photographic start mark on the photographic portion of the combination film which is visible upon development of the film.

Although the novel features which are believed to be characteristic of this invention wil be pointed out with particularity in the appended claims, the manner of its organization and the mode of its operation will be better understood by referring to the following description, read in conjunction with the accompanying drawings, forming a part hereof, in which:

Figures 1, 2, 3, 4, 5, 6:
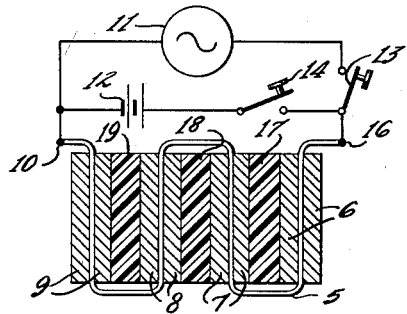
Fig. 1 is a diagrammatic view of the construction of one modification of a magnetic film marker embodying the invention.
Fig. 2 is a diagrammatic view of the construction of a second modification of a magnetic film marker embodying the invention.
Fig. 3 is a diagrammatic view of the construction of a third modification of a magnetic film marker embodying the invention.
Fig. 4 is a schematic circuit diagram of a system for simultaneously providing a magnetic and visible synchronization mark on a magnetic sound film.
Fig. 5 is a cross-sectional view of the visible marker unit taken along the line 5—5 of Fig. 4.
Fig. 6 is a schematic circuit diagram of a system for providing a magnetic mark and a photographic mark on a combination magnetic and photographic sound film.

Referring now to the drawings, in which the same numerals identify like elements, the type of magnetic head shown in Fig. 1 has a flat ribbon-like current conductor 5 interleaved between pairs of mumetal strips 6, 7, 8, and 9 for flux concentration. The terminal 10 of the conductor 5 is connected to either an alternating current source 11 or a direct current source 12 when either switch 13 or switch 14, respectively, is closed. The switches 13 and 14 are connected to the other terminal 16 of the conductor 5. The mumetal strips 6, 7, 8, and 9 are separated, respectively, by insulating strips 17, 18, and 19. The edge of conductor 5, which is seen in Fig. 1, is exposed so that when brought into contact with a stationary magnetic medium (edge of conductor 5 and film are in the plane of the paper) and either a direct or alternating current of the proper frequency is passed through the conductor, the medium is magnetized in parallel striations, which, upon reproduction, will produce an audible "peep" signal. When alternating current is passed through the conductor 5 from the source 11 of the proper frequency and the edges of the conductor 5 are brought into contact with a moving magnetic film, a similar type of signal will be recorded. The pitch of the reproduced signal will depend on both the separation of the parallel sections of the conductor and the speed of the medium during reproduction.

Referring now to Fig. 2, a similar source of alternating current energy 11 and direct current energy source 12 are shown connectable over switches 13 and 14 to a flat ribbon-like insulated conductor 21 of the same form and type as conductor 5 in Fig. 1. However, in this modification, the portions of the conductor between the mumetal strips 22 are connected in parallel between terminals 20 and 23. This head unit functions in the same manner as the unit in Fig. 1. That is, the edges of the parallel sections of the ribbon conductor 21 are brought into contact with the magnetic film so that the edges simultaneously contact the film. The recorded signal will thus again be heard as a pulse or "peep" during reproduction. Since the form of the wave in the film is used only as a start or synchronization mark, it is only necessary that the film magnetization produce the desired "peep" signal to apprise the cutter or editor of the position of the mark.

Referring now to Fig. 3, the sources 11 and 12 are again connected over respective switches 13 and 14 to a series form of flat ribbon-like conductor 24, similar to conductors 5 and 21. In this unit, the recording portions of the conductor are connected in series as in Fig. 1, but are separated solely by insulating strips 25. This simple and economical form of head structure is also sufficient to provide the necessary start or synchronization mark when the edges of the conductor 24 are simultaneously brought into contact with a magnetic film. These strips may also be connected in parallel, as shown in Fig. 2. The mumetal strips only serve to increase sensitivity of the head.

Referring now to Fig. 4, it is sometimes desirable to provide a visible mark at the same transverse point on the magnetic film at which the invisible magnetic mark formed by the heads just described occurs. In Fig. 5, the alternating source of current 11 and the direct current source 12 are shown connectable by respective switches 13 and 14 to the magnetic head 27, which may be of any one of the forms shown in Figs. 1, 2, or 3. The head 27 is shown in contact with a magnetic film 28, the direction of the film being perpendicular to the surface of the paper.

Positioned laterally across the film from the head 27, is a visible marker unit 30, which, as shown in Fig. 5, is composed of a solenoid 31 having a winding 32 and a magnetic core 33. Attached to one end of the core 33, is a brush or pencil marking member 34, the contact element 35 of which is adapted to contact the film 28 when the member is moved downwardly. Around the core 33, is a compression spring 36 having one end abutting the collar 37 at the end of core 33, and the other end abutting one end of the solenoid 31. Now, upon energization of the winding 32, the core 33 will be drawn into the center of the winding 32 and the marking element 35 brought into contact with the film 28. The winding 32 may be energized from a direct current source 40 when switch 41 is closed. Switch 41 is mechanically connected to a switch 42, so that the head 27 and the marker unit 30 are simultaneously energized when either switch 13 or 14 has been previously closed. Thus, the system of Fig. 4 provides both an invisible magnetic mark which may be determined by reproduction, and also, a visible mark, which may be immediately observed on the film.

Referring now to Fig. 6, a system is shown which provides synchronization marks on a combination photographic and magnetic film 44. The film 44 has a normal photographic emulsion over the major portion thereof, while a strip of magnetizable material 45 is provided over a portion of its surface. The same magnetic marking system shown in Fig. 4 is now, however, combined with a photographic marker unit. This latter unit comprises an energy source 46, either of alternating or direct current, a switch 47 mechanically connected to the switch 42, and a lamp 48. The closing of switches 42 and 47 will now simultaneously produce a magnetic mark on the magnetic strip 45 and a photographic mark on the photographic emulsion of the film 44, which will be observable when the film is processed.

In both systems of Figs. 4 and 6, the films may be marked while being advanced or at standstill, and there is thus provided a marking system which will record the desired start or synchronization marks, depending upon the type of film being used. When the films are marked at standstill, either direct or alternating current may be supplied to the head 27. When the films are marked on the run, only alternating current is supplied to the head.

I claim:

1. A magnetic head for recording a reproducible signal on a stationary magnetic film comprising a supporting head, a flat ribbon current carrying conductor mounted therein, said conductor having electrically interconnected parallel sections separated from one another with the edges of said sections in a single plane and exposed for simultaneous engagement with said film, a pair of terminals on said conductor, a direct current energy source adapted to be connected to said terminals when said film is stationary with respect to said conductor, and an alternating current energy source adapted to be connected to said terminals when said film is moving or stationary with respect to said conductor.

2. A system for providing synchronization marks on magnetic sound film, said marks providing an audible signal when reprdouced, comprising a magentic head, a plurality of interconnected flat current conducting elements in parallel planes mounted therein, the film-engaging edges thereof lying in a single plane and being exposed for simultaneous engagement with said magnetic film to produce a characteristic magnetization on said film, a pair of terminals on said elements, an alternating current source adapted to be connected to said terminals when said film is moving with respect to said head, and a direct current source adapted to be connected to said terminals when said film is stationary with respect to said head.

3. A system in accordance with claim 2, in which said plurality of current conducting elements is formed from a single flat conductor having several parallel film contact edges separated from one another.

4. A system in accordance with claim 2, in which said plurality of flat current conducting elements are separated from one another and connected in parallel.

5. A system in accordance with claim 2, in which a visible marking unit is provided, said unit including a solenoid, a movable core for said solenoid, and a marking element on said core adapted to contact said film when one of said current sources is connected to said magnetic head.

6. A magnetic head in accordance with claim 1, in which said parallel sections are connected in series and separated from one another.

7. A magnetic head in accordance with claim 1, in which said parallel sections are connected in parallel and separated from one another.

8. A system for simultaneously recording marks on a combination magnetic and photographic film, comprising a magnetic head having a plurality of spaced, parallel, interconnected current conducting sections with edges exposed for simultaneous engagement with the magnetic portion of said combination film, a light source, means for energizing said light source for impressing light on the photographic emulsion of said combination film, means for energizing said magnetic head, and switch means for simultaneously connecting said light source and said head to their respective energizing means.

References Cited in the file of this patent

UNITED STATES PATENTS

| | | |
|---|---|---|
| 783,389 | Roussel | Feb. 21, 1905 |
| 2,282,929 | Billstein | May 12, 1942 |
| 2,382,609 | Dale | Aug. 14, 1945 |
| 2,418,542 | Camras | Apr. 8, 1947 |
| 2,469,444 | Roys | May 10, 1949 |
| 2,531,642 | Potter | Nov. 28, 1950 |
| 2,536,272 | Friend | Jan. 2, 1951 |
| 2,561,476 | Lang | July 24, 1951 |

FOREIGN PATENTS

| | | |
|---|---|---|
| 618,349 | Great Britain | Feb. 21, 1949 |